(12) United States Patent
Balachandran

(10) Patent No.: US 9,146,712 B2
(45) Date of Patent: Sep. 29, 2015

(54) EXTENSIBLE CODE AUTO-FIX FRAMEWORK BASED ON XML QUERY LANGUAGES

(71) Applicant: VMware, Inc., Palo Alto, CA (US)

(72) Inventor: Vipin Balachandran, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 15 days.

(21) Appl. No.: 14/030,004

(22) Filed: Sep. 18, 2013

(65) Prior Publication Data

US 2015/0082276 A1 Mar. 19, 2015

(51) Int. Cl.
G06F 9/45 (2006.01)
G06F 9/44 (2006.01)

(52) U.S. Cl.
CPC ........................................ G06F 8/30 (2013.01)

(58) Field of Classification Search
CPC ......................................................... G06F 8/30
USPC .................................................. 717/136–167
See application file for complete search history.

(56) References Cited

U.S. PATENT DOCUMENTS

| | | | | |
|---|---|---|---|---|
| 6,175,948 B1 * | 1/2001 | Miller et al. | ................... | 716/105 |
| 7,137,100 B2 * | 11/2006 | Iborra et al. | ................... | 717/106 |
| 7,340,726 B1 * | 3/2008 | Chelf et al. | ................... | 717/126 |
| 2005/0015752 A1 * | 1/2005 | Alpern et al. | ................... | 717/131 |
| 2007/0006170 A1 * | 1/2007 | Hasse et al. | ................... | 717/131 |
| 2007/0169020 A1 * | 7/2007 | Kondoh et al. | ............... | 717/136 |
| 2008/0033968 A1 * | 2/2008 | Quan et al. | ................... | 707/100 |
| 2009/0307664 A1 * | 12/2009 | Huuck et al. | ................... | 717/124 |
| 2012/0311546 A1 * | 12/2012 | Fanning et al. | ............... | 717/136 |

OTHER PUBLICATIONS

Fluri, Beat, et al. "Change distilling: Tree differencing for fine-grained source code change extraction." Software Engineering, IEEE Transactions on 33.11 (2007), pp. 725-743.*
Nilsson-Nyman, Emma, et al. "Declarative intraprocedural flow analysis of Java source code." Electronic Notes in Theoretical Computer Science 238.5 (2009), pp. 155-171.*
Truong, Nghi, Paul Roe, and Peter Bancroft. "Static analysis of students' Java programs." Proceedings of the Sixth Australasian Conference on Computing Education-vol. 30. Australian Computer Society, Inc., 2004, pp. 317-325.*
Vipin Balachandran, "Reducing Human Effort and Improving Quality in Peer Code Reviews Using Automatic Static Analysis and Reviewer Recommendation," Proceedings of the 2013 International Conference on Software Engineering in Practice, ICSE, 2013, pp. 931-940, San Francisco, CA, USA.

* cited by examiner

*Primary Examiner* — Satish Rampuria

(57) ABSTRACT

A method is provided to automatically correct an original source code. An abstract syntax tree (AST) is created from the original source code where the AST includes AST nodes. AST node filter queries are evaluated on the AST to filter out AST nodes with defect patterns. Automatic fixes are applied to the filtered AST nodes to transform the AST. A modified source code is created by deserializing the transformed AST.

24 Claims, 9 Drawing Sheets

200 ↘

FIX-IT(srcText)
1  $P$ = FINDPROBLEMS(srcText) // Stage$_1$
2  // Stage$_2$
3  parser = RESOLVE-AST-PARSER(srcText)
4  ast = parser.PARSE(srcText)
5  // Stage$_3$
6  domTree = GENERATE-DOM-TREE(ast)
7  $i = 1$
8  for each $q \in$ AST-NODE-FILTER-QUERIES()
9      result = EVALUATE-QUERY(domTree, q)
10     $C[i]$ = CREATE-FIX-CONTEXT(result, q, ast)
11     $i = i + 1$
12 // Stage$_4$
13 for $j = 1$ to $P.length$
14     $C[i]$ = CREATE-FIX-CONTEXT($P[j]$, ast)
15     $i = i + 1$
16 for $i = 1$ to $C.length$
17     fix = RESOLVE-FIX($C[i]$)
18     fix.APPLY($C[i]$)
19 for each $q \in$ AST-UPDATE-QUERIES()
20     EVALUATE-QUERY(domTree, q)
21 // Stage$_5$
22 modifiedSrc = DESERIALIZE(ast)
23 return VISUAL-CLIENT(srcText, modifiedSrc)

FIG. 2

```
context.getUnit().accept(new ASTVisitor() {
  @Override
  public boolean visit(MethodDeclaration node) {
    if (!isProblemCoveredByNode(context, node)) {
       return false;
    }
    for (Object obj : node.modifiers()) {
      Modifier m = (Modifier) obj;
      if (m.getStartPosition()==context.getPosition()) {
       m.delete();
       break;
      }
    }
    return false;
  }
});
```

FIG. 4

```
//VariableDeclarationFragment[..//..//
    @PRIMITIVETYPECODE="float" and fn:starts-with
    (.//NumberLiteral/@TOKEN, ".")]//NumberLiteral
```

FIG. 5

```
@Override
public void apply(QueryFilterFixContext context) {
  for (QueryMatch m : context.getQueryMatch()) {
    assert m instanceof AstNodeMatch;
    ASTNode node = ((AstNodeMatch) m).getAstNode();
    assert node instanceof NumberLiteral;
    NumberLiteral literal = (NumberLiteral) node;
    literal.setToken("0" + literal.getToken());
  }
}
```

```
1  let $pattern := "^[A-Z][A-Z0-9]*(_[A-Z0-9]+)*$"
2  for $i in //FieldDeclaration
3      [MODIFIERS/Modifier[@KEYWORD="final"]]
4      //SimpleName[not(fn:matches(@IDENTIFIER, $
           pattern))]
5  let $b := $i/@NAMEBINDING
6  let $id := fn:upper-case($i/@IDENTIFIER)
7  return (
8    replace value of node $i/@IDENTIFIER with $id,
9    for $j in //STATEMENTS//SimpleName[@NAMEBINDING=$b]
10       return replace value of node $j/@IDENTIFIER
              with $id
11 )
```

FIG. 7

EXTENSIBLE CODE AUTO-FIX FRAMEWORK BASED ON XML QUERY LANGUAGES

BACKGROUND

Coding standard violations, non-conformance to best practices, and defect patterns are abundant in existing source code. These source code issues lead to unmaintainable code and potential bugs in later stages of software life cycle when they are more expensive to fix. It is important to detect and correct these source code problems early in the development cycle when they are less expensive to fix.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

In the drawings:

FIG. 2 is a pseudo code for implementing the tool of FIG. 1 in examples of the present disclosure;

FIG. 4 shows a snippet of an automatic fix for a static analyzer check in examples of the present disclosure;

FIG. 5 shows an abstract syntax tree (AST) node filter query written as an XPath expression in examples of the present disclosure;

FIG. 6 shows an automatic fix for the AST node filter query of FIG. 5 in examples of the present disclosure;

FIG. 7 shows an AST update query in examples of the present disclosure;

DETAILED DESCRIPTION

Static analysis techniques such as peer code review and automatic static analysis are available to address coding standard violations, non-conformance to best practices in source code, and defect patterns. However, they are not effective in practice due to (a) involvement of significant human effort, (b) difficulty in validating code against a lengthy coding standard, and (c) prioritization of logic validation in favor of enforcing style and best practices. Automatic static analysis integrated with tool-assisted code review process has been proposed to automate style and design related checks. Even with such a solution, a developer still has to analyze the reported issues, find potential fixes, and re-submit the code for review. Thus what are needed are method and apparatus to pre-process the source code to detect and fix automatically a large subset of source code problems so that there are less style or design issues for a reviewer to detect and a developer to fix.

In examples of the present disclosure, a software tool is provided to automatically detect and correct source code problems. The tool may be standalone or integrated with an integrated development environment (IDE) or a code review tool. In examples of the present disclosure, the tool uses automatic static analysis tools to detect source code problems and fixes these issues with built-in automatic fixes. The tool is configurable as new static analysis tools, custom defect patterns, and new automatic fixes can be added to the tool. The automatic fixes may include automatic refactoring that improve code readability and reduce code complexity in order to improve the maintainability of code.

In examples of the present disclosure, source code problems are auto-detected and auto-corrected using abstract syntax trees (ASTs) and extensible markup language (XML) query languages. A source code may be represented as an AST, which may be modeled as a document object model (DOM) tree. AST node filter queries, such as XPath and XQuery expressions, may be evaluated on the AST DOM tree by an XML query engine to filter out AST nodes with source code problems, and automatic fixes are applied to fix the problems by transforming the AST. AST update queries, such as XQuery UPDATE expressions, may be evaluated on the AST DOM tree by the XML query engine to filter out AST nodes with source code problems and fix those problems by transforming the AST. Static analyzers may be used to identify source code problems in the source code and automatic fixes are applied to fix those problems by transforming the AST.

Figure 1:
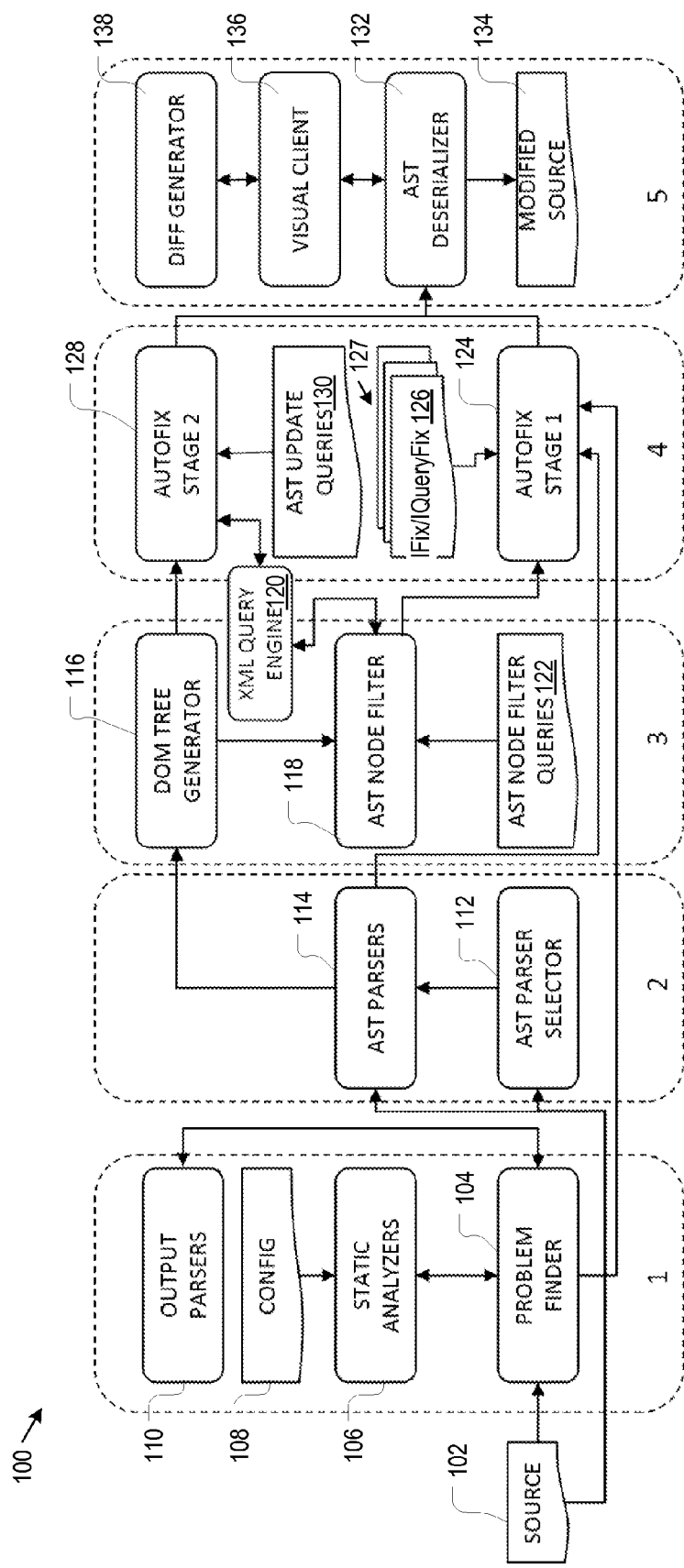
FIG. 1 is a block diagram illustrating the architecture of a software tool to automatically detect and correct source code problems in examples of the present disclosure.

FIG. 1 is a block diagram illustrating the architecture of a software tool 100 to automatically detect and correct problems in original source code 102 in examples of the present disclosure. Tool 100 may be implemented with computer readable instructions to be executed by a processor. Tool 100 includes modules grouped into the following stages: stage 1—problem identification; stage 2—AST generation, stage 3—document object model (DOM) tree generation and node filtering; stage 4—auto-correction; and stage 5—user interaction.

In stage 1, a problem finder module 104 invokes static analyzers 106 to analyze original source code 102 and identify source code problems, such as coding standard violations, best practice violations, and defect patterns. Static analyzers 106 may include FindBugs, Checkstyle, and PMD. A configuration module 108 provides the configurations for static analyzers 106, such as rules or checks to run and customized errors or warning messages. As output formats of static analyzers 106 vary, problem finder 104 invokes output parsers 110 to convert the static analyzer outputs to a common format. Problem finder 104 sends the source code problems to a first auto-fix module 124 in stage 4.

In stage 2, an AST parser selector 112 selects an AST parser 114 from a set of AST parsers 114 based on the programming language of original source code 102. AST parsers 114 may include ASTParser in Eclipse JDT core and ANTLR parsers. AST parser selector 112 uses the selected AST parser 114 to generate an AST based on original source code 102, and outputs the AST to a DOM tree generator 116 in stage 3 and first auto-fix module 124 in stage 4.

In stage 3, DOM tree generator 116 creates a DOM tree adapter that wraps around the AST. The DOM tree adapter provides a DOM-compatible interface to the underlying AST so updates on the DOM tree adapter are translated to updates on the underlying AST. An AST node filter 118 uses an extensible markup language (XML) query engine 120 to evaluate AST node filter queries 122 on the DOM tree adapter to filter out AST nodes that match user defined defect patterns. An AST node filter query 122 may be an XPath or an XQuery expression that is to detect AST nodes having a user defined defect pattern. AST node filter 118 creates a query filter fix context for each of the query results. A query filter fix context is a fix context that includes information to be used by an automatic fix to correct a source code problem identified by an AST node filter query 122.

In stage 4, first auto-fix module 124 creates a static analyzer problem fix context for each of the source code problems received from problem finder 104 in stage 1. Similar to a query filter fix context, a static analyzer problem fix context is a fix context that includes information to be used by an automatic fix to correct a source code problem identified by a static analyzer 106.

First auto-fix module 124 then determines an automatic fix for each of the fix contexts, and applies the automatic fix to the AST received from the selected AST parser 114. For each fix context, first auto-fix module 124 selects an automatic fix 126 from a database 127 based on the AST node filter query ID or the source code problem type listed in the fix contexts. A second auto-fix module 128 uses XML query engine 120 to evaluate AST update queries 130 on the AST DOM tree adapter by identifying and transforming user defined defect patterns in the AST DOM tree adapter received from DOM tree generator 116. An AST update query 128 may be an XQuery UPDATE expression that can be applied without a fix context. First auto-fix module 124 and second auto-fix module 128 outputs the transformed AST to an AST deserializer 132 in stage 5.

In stage 5, AST deserializer 132 generates a modified source code 134 based on the transformed AST. A visual client 136 presents the identified problems, original source code 102, and modified source code 134 to user. Visual client 136 uses a difference generator 138 to provide a side-by-side comparison of original source code 102 and modified source code 134, and provide options to inspect the source code problems and the corresponding fixes, and to selectively apply a subset of fixes to original source code 102. Modified source code 134 may be shown in redlined form using underlining and strikethroughs.

Figure 3:
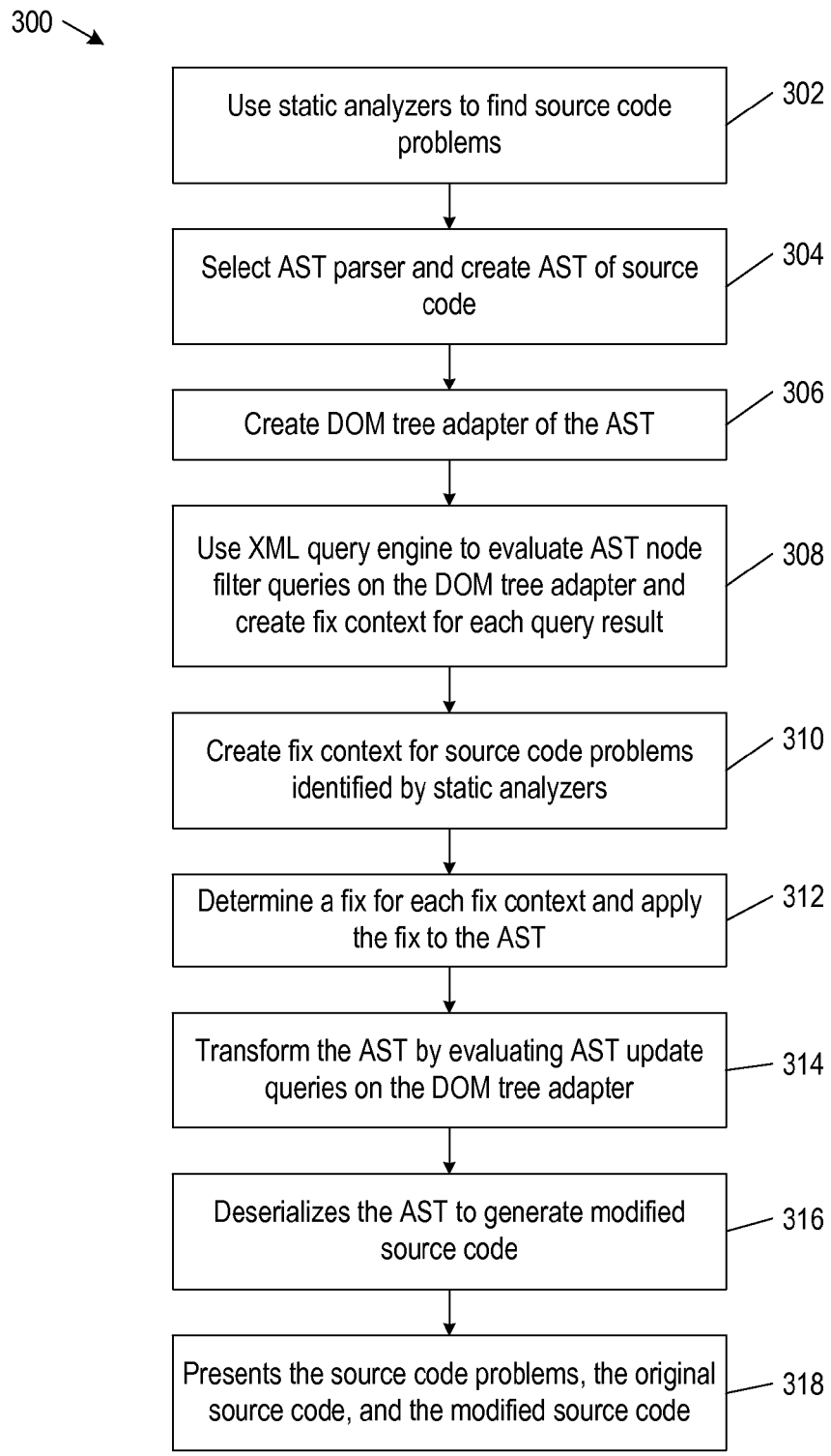
FIG. 3 is a flowchart of a method representing the pseudo code of FIG. 2 in examples of the present disclosure.

FIG. 2 is a pseudo code 200 for implementing software tool 100 (FIG. 1) in examples of the present disclosure. FIG. 3 is a flowchart of a method 300 representing pseudo code 200 (FIG. 2) in examples of the present disclosure. Method 300 may begin in block 302.

In block 302, problem finder 104 (FIG. 1) of tool 100 uses static analyzers 106 (FIG. 1) finds problems in source code 102 (FIG. 1). Block 302 corresponds to line 1 of pseudo code 200. Block 302 may be followed by block 304.

In block 304, AST parser selector 112 (FIG. 1) of tool 100 selects an AST parser 114 (FIG. 1) based on the source code language and generates an AST. Block 304 corresponds to lines 3 and 4 of pseudo code 200. Block 304 may be followed by block 306.

In block 306, DOM tree generator 116 (FIG. 1) of tool 100 generates a DOM tree adapter that wraps around the AST. Block 306 corresponds to line 6 of pseudo code 200. Block 306 may be followed by block 308.

In block 308, AST node filter 118 (FIG. 1) of tool 100 evaluates AST node filter queries 122 (FIG. 1) on the DOM tree adapter and creates a query filter fix context for each of the query results. Block 308 corresponds to lines 7 to 11 of pseudo code 200. Block 308 may be followed by block 310.

In block 310, first auto-fix module 124 (FIG. 1) of tool 100 creates a static analyzer problem fix context for each of the problems identified by static analyzers 106 in block 302. Block 310 corresponds to lines 13 to 15 of pseudo code 200. Block 310 may be followed by block 312.

In block 312, first auto-fix module 124 of tool 100 determines an automatic fix 126 from database 127 (FIG. 1) for each of the fix contexts created in blocks 308 and 310, and applies the fix to the AST. First auto-fix module 124 selects the appropriate automatic fix 126 based on the AST node filter query ID or the source code problem type listed in each fix context. Block 312 corresponds to lines 16 to 18 of pseudo code 200. Block 312 may be followed by block 314.

In block 314, second auto-fix module 128 (FIG. 1) of tool 100 transforms the AST by evaluating AST update queries 130 (FIG. 1) on the DOM tree adapter. Block 314 corresponds to lines 19 and 20 of pseudo code 200. Block 314 may be followed by block 316.

In block 316, AST deserializer 132 (FIG. 1) of tool 100 deserializes the AST to generate modified source code 134 (FIG. 1). Block 316 corresponds to line 22 of pseudo code 200. Block 316 may be followed by block 318.

In block 318, visual client 136 (FIG. 1) of tool 100 presents the identified source code problems, original source code 102, and modified source code 134 to user. As described above, a side-by-side comparison is presented so user may inspect the source code problems and the corresponding fixes, and to selectively apply a subset of fixes to original source code 102. Block 318 corresponds to line 23 of pseudo code 200.

Referring to FIG. 1, software tool 100 is extendable in the following manners in examples of the present disclosure.

New static analyzers 106 may be added to stage 1 to detect new source code problems.

For a source code problem identified by a static analyzer 106 in stage 1 that does not have a built-in automatic fix, a new automatic fix 126 may be created and added to database 127. When automatic fixes 126 are written in Java in some examples of the present disclosure, an interface called "IFix" is provided. The interface IFix has an apply method to accept static analyzer problem fix contexts for source code problems identified by static analyzers 106. For example, a static analyzer problem fix context includes the position of a source code problem in source code 102, the source code problem type identified by static analyzer 106, the root of the AST, and an instance of "ASTRewrite" to edit the AST. Automatic fix 126 implements the interface IFix and applies a fix to the AST. First auto-fix module 124 selects the appropriate automatic fix 126 from database 127 based on the source code problem type listed in the static analyzer problem fix contexts.

Automatic fix 126 may follow a visitor design pattern to visit AST nodes of an AST node type associated with the source code problem, check if each AST node covers the source code problem, and apply changes to each AST node that covers the source code problem. FIG. 4 shows a snippet of an automatic fix 400 for the Checkstyle's "RedundantModifier" check that follow the visitor design pattern in examples of the present disclosure. The RedundantModifier check detects redundant modifiers such as public, static, final modifiers for a variable declaration in an interface. As described later, a designer tool 800 (FIG. 8) may be used to identify the AST node type associated with a specific source code problem.

Figure 8:
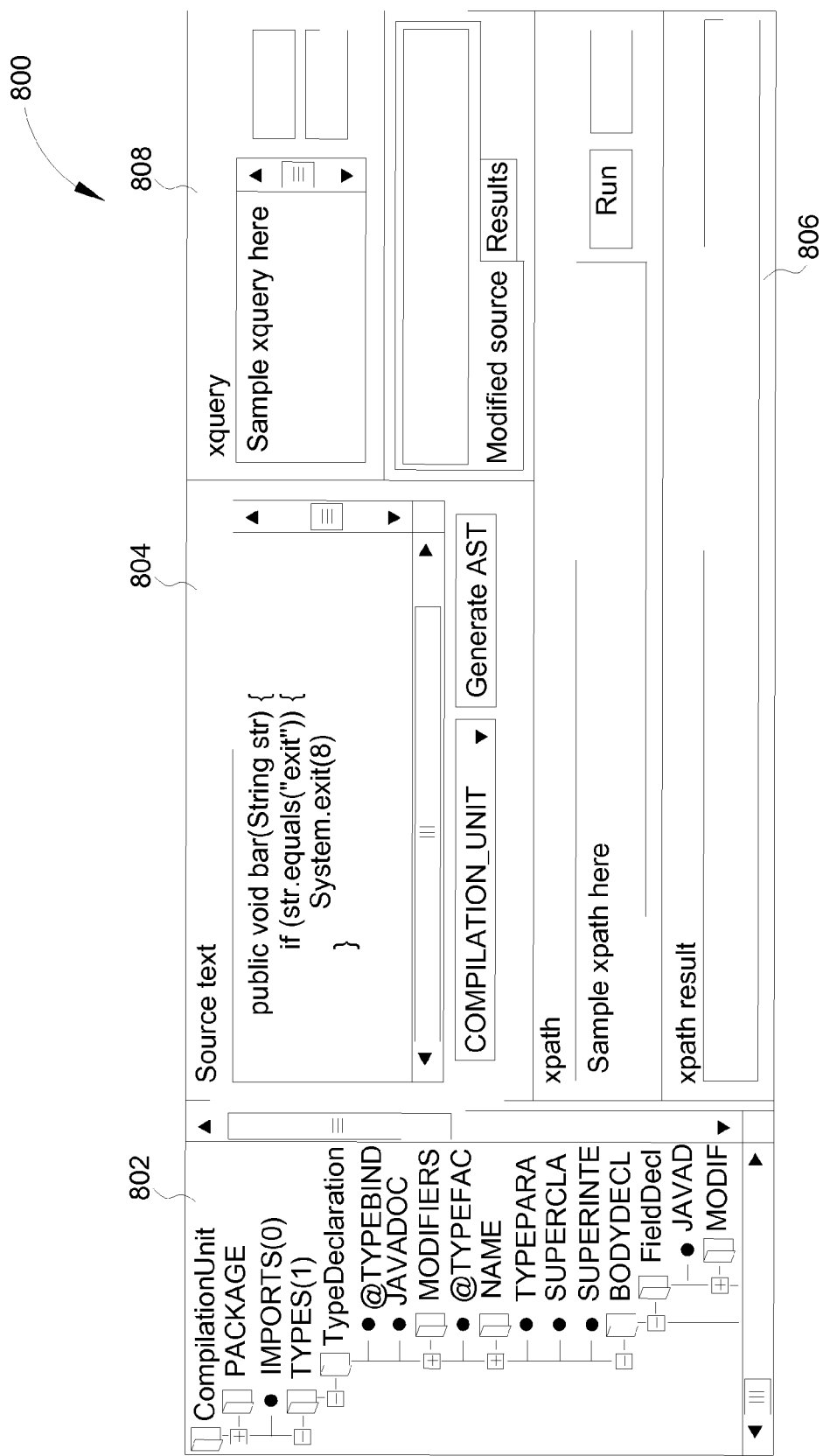
FIG. 8 shows a designer tool in examples of the present disclosure.

AST node filter queries 122 and their automatic fixes 126 may be added to detect and fix custom defect patterns. AST node filter queries 122 may be written as XPath or XQuery expressions. FIG. 5 shows an AST node filter query 500 written as an XPath expression in examples of the present disclosure. AST node filter query 500 may be used to detect a Java coding standard violation that requires floating point constants to be written with a digit before the decimal point. AST node filter queries 122 like AST node filter query 500 may be designed using designer tool 800 (FIG. 8).

AST node filter 118 uses XML query engine 120 to evaluate an AST node filter query 122 on a DOM tree adapter. AST node filter 118 stores AST nodes matching AST node filter query 122 or AST nodes with AST node properties matching AST node filter query 122 in a query filter fix context. The query filter fix context may include the query string and a list of the AST nodes that match the query string.

When automatic fixes 126 are written in Java in some examples of the present disclosure, an interface called "IQueryFilterFix" is provided. The interface IQueryFilterFix has an apply method to accept query filter fix contexts for user defined defect patterns identified by AST node filter queries 122. An automatic fix 126 implements the interface IQueryFilterFix and applies a fix to the AST. First auto-fix module 124 selects the appropriate automatic fix 126 from database 127 based on the AST node query filter ID in the query filter fix context.

FIG. 6 shows an automatic fix 600 for AST node filter query 500 (FIG. 5) in examples of the present disclosure. Automatic fix 600 modifies the TOKEN property of the NumberLiteral AST node.

When the defect pattern is too complicated to be expressed in XPath or XQuery expressions, an AST node filter query 122 may be written as "/" to match the root of the DOM tree adapter and the corresponding automatic fix can traverse the entire DOM tree adapter to find the desired defect pattern and fix it.

An AST update query, which may be written as an XQuery UPDATE expression, may be added when a fix is possible by deleting an AST node or by replacing the value of an AST node property in examples of the present disclosure. FIG. 7 shows an AST update query 700 in examples of the present disclosure. AST update query 700 provides a fix for Checkstyle's "ConstantName" check, which detects any constant identifier with characters other than upper-case letters, digits, and underscores.

Figure 9:
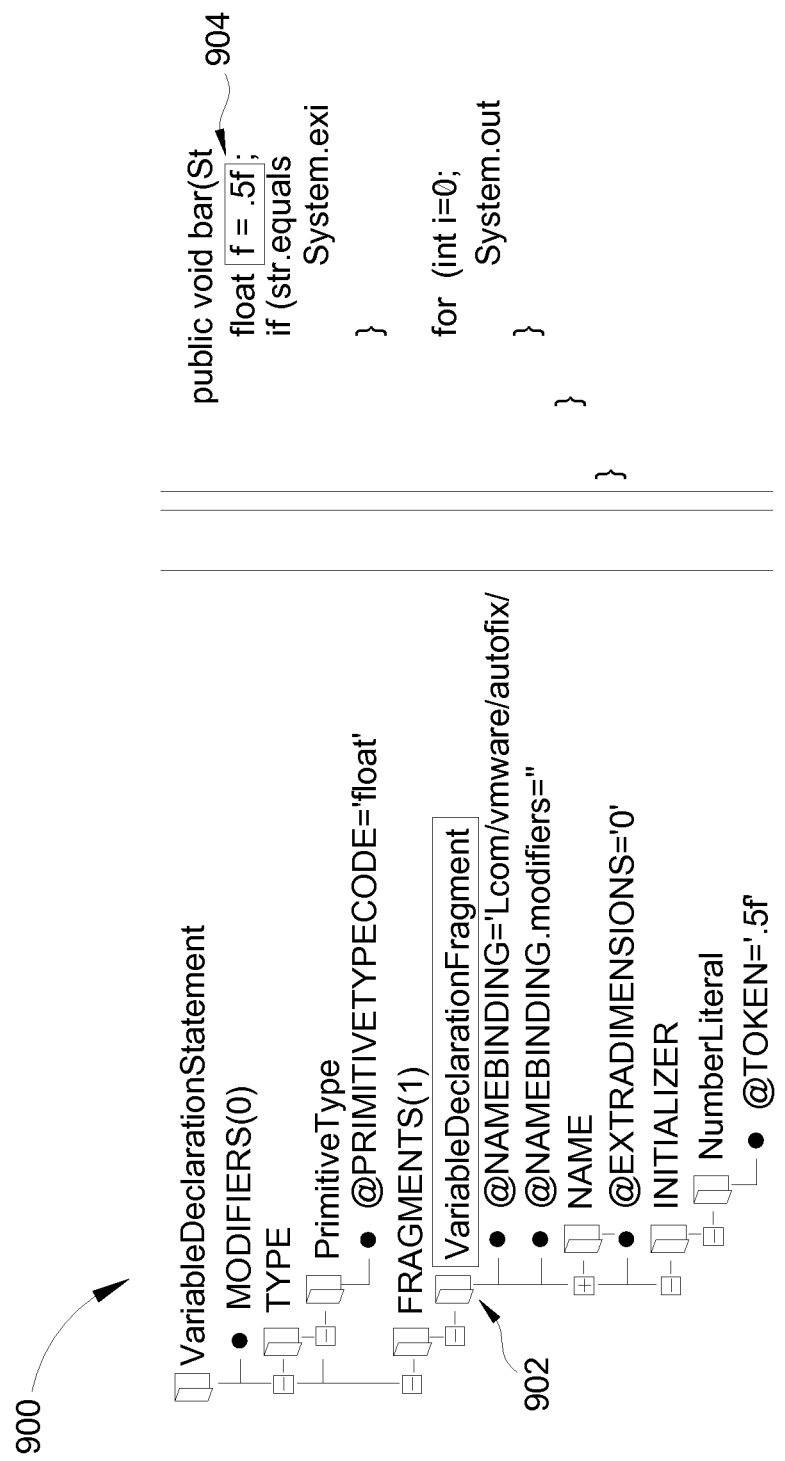
FIG. 9 shows a sample AST in examples of the present disclosure.

FIG. 8 shows designer tool 800 in examples of the present disclosure. Designer tool 800 provides an interface that may be used to design AST node filter queries 122 (FIG. 1), automatic fixes 126 (FIG. 1), and AST update queries 130 (FIG. 1). In the main window of designer tool 800, an AST view pane 802 displays the AST of a snippet of source code 102 (FIG. 1) entered in a source code pane 804. FIG. 9 shows a sample AST 900 in examples of the present disclosure. The highlighted AST node 902 corresponds to the code fragment 904 "f=0.5f" in the source code. Each of the AST nodes can have zero or more attributes (names prefixed with @) and zero or more child elements (nodes with name in upper-case letters). Each of the child elements can have zero or more AST nodes as its children where the child count is in parentheses after the node name. The "*BINDING" attributes are special attributes that does not have a structural significance and is used for cross-referencing between AST nodes. For example, any "SimpleName" node corresponding to the float variable "f" (say the node representing f in the ExpressionStatement f++) will have the same NAMEBINDING value as that of its VariableDeclarationFragment (node representing its declaration). The listing of AST update query 700 (FIG. 7) uses this concept to find the references of the constant identifier.

Designer tool 800 may be used to design an automatic fix 126 for source code 102 problem identified by a static analyzer 106 in examples of the present disclosure. A user manually identifies a problem in source code 102. The user checks the output of static analyzer 106 for the source code problem and notes the source code problem type. The user uses designer tool 800 to generate an AST of source code 102 and identifies an AST node to modify to fix the source code problem, such as AST node 902 to modify to fix the floating point without a digit before the decimal point in FIG. 9. The user writes an automatic fix 126 for the AST node type of the identified AST node and the source code problem type. This automatic fix 126 takes as input a static analyzer problem fix context.

Figure 10:
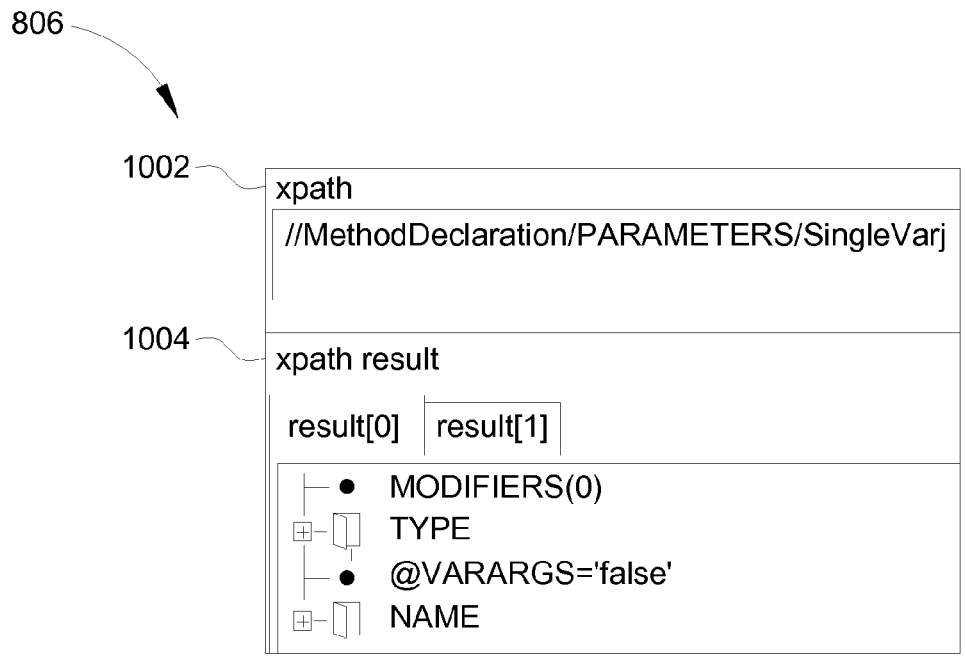
FIG. 10 shows an AST node filter query in an XPath pane of the designer tool of FIG. 8 in examples of the present disclosure.

Designer tool 800 may be used to design an AST node filter query 122 and its automatic fix 126 in examples of the present disclosure. A user manually identifies a problem in source code 102. The user uses designer tool 800 to generate an AST of source code 102 and identifies an AST node to modify to fix the source code problem. As shown in FIG. 10 in examples of the present disclosure, the user writes an AST node filter query 122 as an XPath expression in an area 1002 of XPath view pane 806 (FIGS. 8 and 10), runs AST node query filter 122 to detect a user defined defect pattern in source code 102, and reviews the result in an area 1004 of XPath pane 806. The user may modify AST node query filter 122 until the query results are satisfactory. The user then writes an automatic fix 126 for AST node filter query 122 for the AST node query filter ID. This automatic fix 126 takes as input a query filter fix contexts. User may also design AST node filter queries using XQuery.

Figure 11:
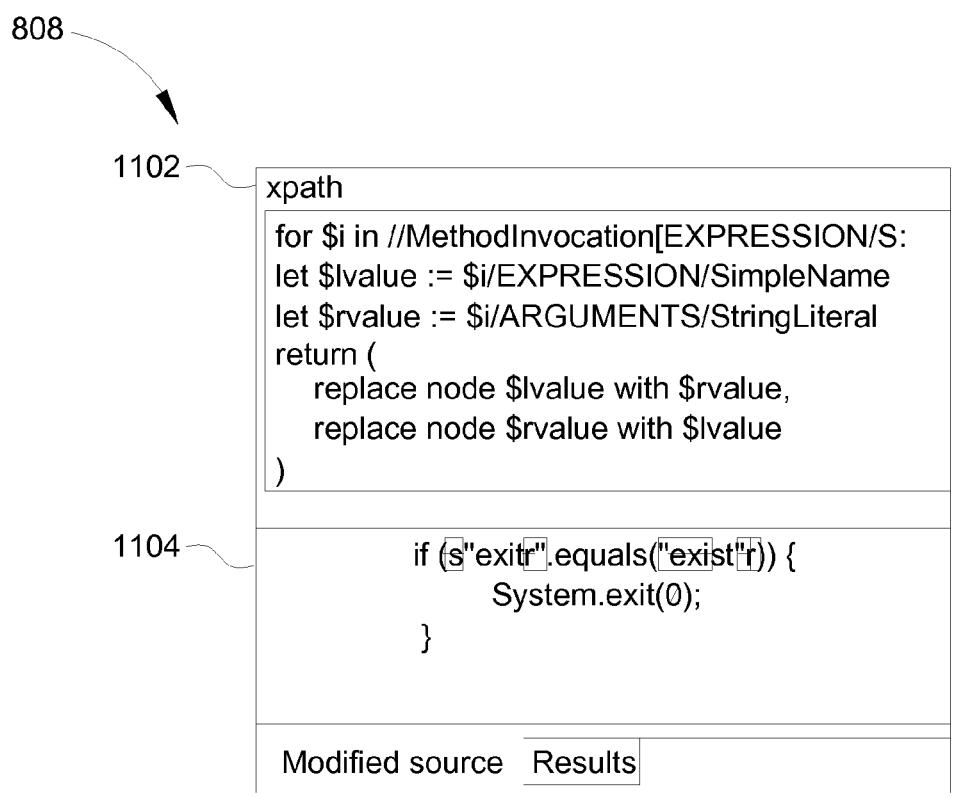
FIG. 11 shows an AST update query in an XQuery pane of the designer tool of FIG. 8 in examples of the present disclosure.

Designer tool 800 may be used to design an AST update query 130 in examples of the present disclosure. A user manually identifies a problem in source code 102. The user uses designer tool 800 to generate an AST of source code 102 and identifies an AST node to modify to fix the source code problem. As shown in FIG. 11 in examples of the present disclosure, the user writes an AST update query 130 as an XQuery UPDATE expression in an area 1102 of XQuery view pane 808 (FIGS. 8 and 11), runs AST update query 130 to transform a user defined defect pattern in source code 102, and reviews the result in an area 1104 of XQuery pane 808. The user may modify AST update query until the query results are satisfactory.

Figure 12:
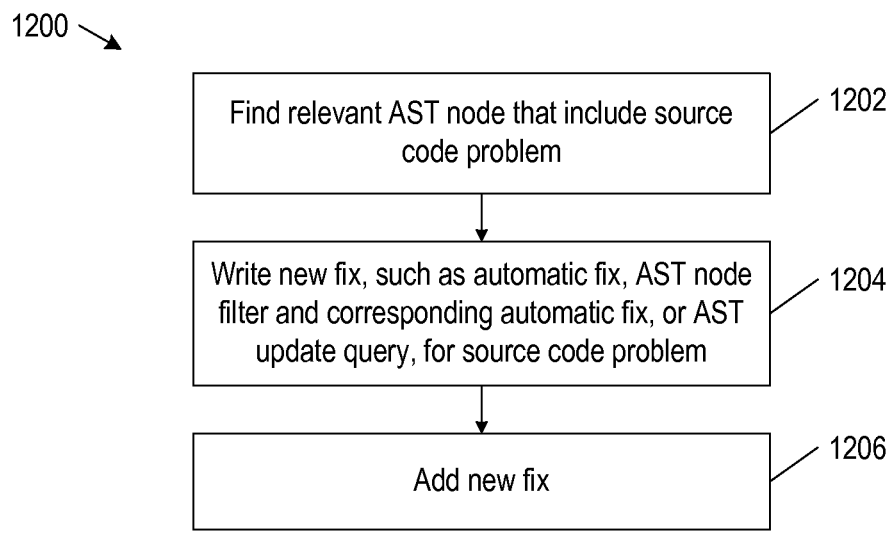
FIG. 12 is a flowchart of a method to add a new fix for a source code problem to the tool of FIG. 1 in examples of the present disclosure.

FIG. 12 is a flowchart of a method 1200 to add a new fix for a source code problem to tool 100 (FIG. 1) in examples of the present disclosure. The new fix may be an automatic fix 126 (FIG. 1), an AST node filter query 122 (FIG. 1) and a corresponding automatic fix 126, or a new AST update query 130 (FIG. 1). Method 1200 may begin in block 1202.

In block 1202, a relevant AST node that includes the source code problem is determined. As described above, a user may use designer tool 800 (FIG. 8) to generate an AST of a source code and identifies an AST node to modify to fix the source code problem. The source code problem may be automatically detected by a static analyzer 106 (FIG. 1) or manually detected from source code 102 (FIG. 1). Block 1202 may be followed by block 1204.

In block 1204, an automatic fix is written to fix the source code problem identified by a static analyzer 106. Alternatively an AST node filter query 122 is written to identify the source code problem and an automatic fix 126 is written to fix the source code problem. Alternatively an AST update query 130 is written to fix the source code problem. Block 1204 may be followed by block 1206.

In block 1206, the new fix is added to tool 100. For example, the new fix is added to a configuration file that is read when tool 100 is executed to analyze source code.

One or more embodiments of the present disclosure may be implemented as one or more computer programs or as one or more computer program modules embodied in one or more computer readable media. The term computer readable storage medium may refer to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, a solid-state drive, and other optical and non-optical data storage devices. The computer readable medium can also be distributed over a network coupled computer system so that the computer readable code is stored and executed in a distributed fashion.

From the foregoing, it will be appreciated that various embodiments of the present disclosure have been described herein for purposes of illustration, and that various modifications may be made without departing from the scope and spirit of the present disclosure. For example, automatic fixes 126 may be written in another programming language such as C or C++, and designer tool 800 may test automatic fixes 126 written in another languages such as Java or C++. Tool 100 may be used as a stand-alone tool or integrated with an IDE or a code review tool. For example, tool 100 may be a preprocessing module of a code review tool that automatically corrects a subset of source code problems before sending a review request to code reviewers with a list of the remaining source code problems. In another example, tool 100 may be an IDE plugin. Accordingly, the various embodiments disclosed herein are not intended to be limiting, with the true scope and spirit being indicated by the following claims.

I claim:

1. A method to automatically correct an original source code, the method comprising:
   receiving, by a processor, the original source code;
   executing, by the processor, a static analyzer to detect source code problems in the original source code;
   executing, by the processor, an abstract syntax tree (AST) parser on the original source code to generate an AST comprising AST nodes;
   executing, by the processor, an XML query engine to evaluate AST node filter queries on the AST to filter out one or more AST nodes with defect patterns;
   creating, by the processor, query filter fix contexts based on the filtered AST nodes;
   creating, by the processor, static analyzer problem fix contexts based on the source code problems detected by the static analyzer, wherein the static analyzer problem fix contexts include information used to fix the source code problems in the AST;
   selecting, by the processor, automatic fixes based on the query filter fix contexts and the static analyzer problem fix contexts, wherein selecting the automatic fixes comprises selecting at least some of the automatic fixes based on types of the source code problems in the static analyzer problem fix contexts;
   executing, by the processor, the automatic fixes to transform the AST; and
   creating, by the processor, a modified source code by deserializing the transformed AST.

2. The method of claim 1, wherein the AST node filter queries include XPath expressions, and evaluating AST node filter queries on the AST comprises using an XML query engine to evaluate the XPath expressions on the AST.

3. The method of claim 1, wherein the AST node filter queries include XQuery expressions, and evaluating AST node filter queries on the AST comprises using an XML query engine to evaluate the XQuery expressions on the AST.

4. The method of claim 1, wherein:
   the query filter fix contexts include information used to fix the defect patterns in the filtered AST nodes; and
   selecting the automatic fixes comprises selecting at least some of the automatic fixes based on IDs of the AST node filter queries in the query filter fix contexts.

5. The method of claim 1, further comprising evaluating AST update queries on the AST to transform the AST.

6. The method of claim 5, wherein the AST update queries comprise XQuery UPDATE expressions, and evaluating AST update queries on the AST comprises using an XML query engine to evaluate the XQuery UPDATE expressions on the AST and transform the AST.

7. The method of claim 1, further comprising:
   displaying the AST;
   receiving an XPath expression or an XQuery expression; and
   displaying query results from running the XPath expression or the XQuery expression on the AST.

8. The method of claim 1, further comprising:
   receiving a new fix for a source code problem, the new fix comprising an automatic fix for the source code problem identified by the static analyzer, or a new AST node query filter to find the source code problem and the automatic fix to fix the source code problem, or a new AST update query to find and fix the source code problem; and
   applying the new fix to the source code to fix the source code problem.

9. A system, comprising:
   a processor and a memory implementing:
      a problem finder to apply a static analyzer to detect source code problems in an original source code;
      an AST parser to receive the original source code and create an abstract syntax tree (AST) of the original source code, the AST comprising AST nodes;
      an AST node filter to:
         evaluate AST node filter queries on the AST to filter out one or more AST nodes with defect patterns; and
         create query filter fix contexts based on the filtered AST nodes;
      an auto-fix module to:
         create static analyzer problem fix contexts based on the source code problems in the source code, wherein the static analyzer problem fix contexts include information used to fix the source code problems in the AST;
         select automatic fixes based on the query filter fix contexts and the static analyzer problem fix contexts, wherein selecting the automatic fixes comprises selecting at least some of the automatic fixes based on types of the source code problems in the static analyzer problem fix contexts; and apply the automatic fixes to the AST to transform the AST; and an AST deserializer to create a modified source code by deserializing the transformed AST.

10. The system of claim 9, wherein the AST node filter queries include XPath expressions, and evaluate AST node filter queries on the AST comprises using an XML query engine to evaluate the XPath expressions on the AST.

11. The system of claim 9, wherein the AST node filter queries include XQuery expressions, and evaluate AST node filter queries on the AST comprises using an XML query engine to evaluate the XQuery expressions on the AST.

12. The system of claim 9, wherein:

the query filter fix contexts include information used the defect patterns in the filtered AST nodes; and the auto-fix module is to select at least some of the automatic fixes based on IDs of the AST node filter queries in the query filter fix contexts.

13. The system of claim 9, further comprising another auto-fix module to evaluate AST update queries on the AST to transform the AST.

14. The system of claim 13, wherein the AST update queries comprise XQuery UPDATE expressions, and evaluate AST update queries on the AST comprises using an XML query engine to evaluate the XQuery UPDATE expressions on the AST.

15. The system of claim 9, further comprising a designer tool to:

display the AST;

receive an XPath expression or an XQuery expression; and display query results from running the XPath expression or the XQuery expression on the AST.

16. The system of claim 9, further comprising a document object model (DOM) generator to wrap a DOM tree adapter around the AST.

17. A non-transitory computer-readable storage medium encoded with instructions executable by a processor to:

receive an original source code;

apply a static analyzer to detect source code problems in the original source code;

create an abstract syntax tree (AST) of the original source code, the AST comprising AST nodes;

evaluate AST node filter queries on the AST to filter out one or more AST nodes with defect patterns;

create query filter fix contexts based on the filtered AST nodes;

create static analyzer problem fix contexts based on the source code problems detected by the static analyzer, wherein the static analyzer problem fix contexts include information used to fix the source code problems in the AST;

select, by the processor, automatic fixes based on the query filter fix contexts and the static analyzer problem fix contexts, wherein selecting the automatic fixes comprises selecting at least some of the automatic fixes based on types of the source code problems;

apply automatic fixes to the AST to transform the AST; and create a modified source code by deserializing the transformed AST.

18. The non-transitory computer-readable storage medium of claim 17, wherein the AST node filter queries include XPath expressions, and evaluating AST node filter queries on the AST comprises using an XML query engine to evaluate the XPath expressions on the AST.

19. The non-transitory computer-readable storage medium of claim 17, wherein the AST node filter queries include XQuery expressions, and evaluating AST node filter queries on the AST comprises using an XML query engine to evaluate the XQuery expressions on the AST.

20. The non-transitory computer-readable storage medium of claim 17, wherein:

the query filter fix contexts include information used to fix the defect patterns in the filtered AST nodes; and selecting the automatic fixes comprises selecting at least some of the automatic fixes based on IDs of the AST node filter queries in the query filter fix contexts.

21. The non-transitory computer-readable storage medium of claim 17, further comprising instructions executable by the processor to evaluate AST update queries on the AST to transform the AST.

22. The non-transitory computer-readable storage medium of claim 21, wherein the AST update queries comprise XQuery UPDATE expressions, and evaluating AST update queries on the AST comprises using an XML query engine to evaluate the XQuery UPDATE expressions on the AST.

23. The non-transitory computer-readable storage medium of claim 17, further comprising instructions executable by the processor to:

displaying the AST;

receiving an XPath expression or an XQuery expression; and displaying query results from running the XPath expression or the XQuery expression on the AST.

24. The non-transitory computer-readable storage medium of claim 17, further comprising instructions executable by the processor to:

receive a new fix for a source code problem, the new fix comprising an automatic fix for the source code problem identified by the static analyzer, a new AST node query filter to find the source code problem and the automatic fix to fix the source code problem, or a new AST update query to find and fix the source code problem; and apply the new fix to the source code to fix the source code problem.

* * * * *